United States Patent
Nakane

(10) Patent No.: US 12,103,386 B2
(45) Date of Patent: Oct. 1, 2024

(54) VEHICLE SPEED LIMITER, VEHICLE SPEED LIMITING METHOD AND VEHICLE

(71) Applicant: TOYOTA JIDOSHA KABUSHIKI KAISHA, Toyota (JP)

(72) Inventor: Yoshihide Nakane, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 241 days.

(21) Appl. No.: 17/953,086

(22) Filed: Sep. 26, 2022

(65) Prior Publication Data
US 2023/0099758 A1   Mar. 30, 2023

(30) Foreign Application Priority Data
Sep. 27, 2021   (JP) ................. 2021-156289

(51) Int. Cl.
*B60K 28/00*   (2006.01)
*B60K 31/00*   (2006.01)

(52) U.S. Cl.
CPC ...... *B60K 31/00* (2013.01); *B60K 2031/0091* (2013.01); *B60Y 2300/43* (2013.01)

(58) Field of Classification Search
CPC ............ B60K 31/00; B60K 2031/0091; B60K 28/00; B60Y 2300/43; B60W 2540/10; B60W 2540/106; B60W 50/087; B60W 50/10; B60W 30/146
USPC .......................................................... 701/93
See application file for complete search history.

(56) References Cited

U.S. PATENT DOCUMENTS

| | | | |
|---|---|---|---|
| 8,355,851 B2 | 1/2013 | Inoue et al. | |
| 8,370,040 B2 | 2/2013 | Inoue et al. | |
| 8,396,640 B2* | 3/2013 | Yuzawa | B60W 30/146 |
| | | | 701/93 |
| 8,417,430 B2 | 4/2013 | Saeki | |
| 8,548,709 B2 | 10/2013 | Morita | |
| 8,768,597 B2 | 7/2014 | Kagawa | |
| 9,174,643 B2 | 11/2015 | Aso | |
| 10,017,178 B2 | 7/2018 | Morimoto et al. | |
| 10,118,617 B2 | 11/2018 | Urano et al. | |
| 10,486,698 B2 | 11/2019 | Masui et al. | |

(Continued)

FOREIGN PATENT DOCUMENTS

| | | |
|---|---|---|
| JP | 2003-227365 A | 8/2003 |
| JP | 2008-37152 A | 2/2008 |
| JP | 2017-1406 A | 1/2017 |

*Primary Examiner* — Shardul D Patel
(74) *Attorney, Agent, or Firm* — Sughrue Mion, PLLC

(57) ABSTRACT

In a vehicle speed limiter in which an electronic control unit that controls a drive force of an engine based on at least an accelerator opening controls a drive force of a vehicle so that a vehicle speed does not exceed a speed limit, the electronic control unit is configured to allow the vehicle speed to be equal to or higher than the limit vehicle speed and control the drive force generated by the engine based on the accelerator opening when the accelerator opening becomes a value equal to or larger than a increase reference value larger than a decrease reference value after the accelerator opening has decreased to a value equal to or smaller than the decrease reference value within a predetermined time from a time point when the vehicle speed limitation is released during the vehicle speed limitation being executed by the speed limiting control.

8 Claims, 6 Drawing Sheets

(56) References Cited

U.S. PATENT DOCUMENTS

2016/0355183 A1* 12/2016 Nakade ................ B60K 31/047
2019/0295419 A1* 9/2019 Tosa ....................... G08G 1/048

* cited by examiner

VEHICLE SPEED LIMITER, VEHICLE SPEED LIMITING METHOD AND VEHICLE

BACKGROUND OF THE INVENTION

1. Field of the Invention

The present invention relates to a speed limiter for a vehicle such as an automobile, a speed limiting method, and a vehicle.

2. Description of the Related Art

A speed limiter executes vehicle speed limiting control that reduces a drive force of a vehicle without requiring a driver's drive force reducing operation when a vehicle speed is about to exceed a limit vehicle speed. According to the speed limiter, it is possible to prevent the vehicle speed from exceeding the limit vehicle speed.

Even a driver driving a vehicle equipped with a speed limiter may wish to accelerate the vehicle so that a vehicle speed exceeds a limit speed when, for example, trying to overtake a preceding vehicle running at a low vehicle speed. As described in Japanese Patent Application Laid-open No. 2008-037152, it is known to allow a vehicle speed to increase beyond a limit vehicle speed so as to realize a driver's wishes as above when, for example, an accelerator pedal is stepped on by the driver while the vehicle speed is limited.

According to the conventional speed limiter as described in the above-mentioned Japanese Patent Application Laid-open Publication, in such a situation, for example, where a vehicle tries to overtake a preceding vehicle, a driver can increase a vehicle speed to a limit speed or higher by depressing an accelerator pedal.

However, in a conventional speed limiter, it is difficult for a driver to understand how and how much an accelerator pedal should be depressed so that a vehicle speed can be allowed to increase beyond a limit speed while the vehicle speed is limited.

The present invention provides an improved speed limiter that allows an accelerator operation to be performed so that a vehicle increases beyond a limit vehicle speed in distinction from an accelerator operation that should prevent the vehicle speed from increasing beyond the limit vehicle speed.

According to the present invention; a vehicle speed limiter is provided which has a drive device that generates a drive force and an electronic control unit that controls a drive force generated by the drive device based on at least an accelerator opening, and the electronic control unit is configured to perform speed limiting control executing vehicle speed limitation that limits a vehicle speed by controlling the drive force generated by the drive device so that the vehicle speed becomes equal to or lower than a limit vehicle speed.

The electronic control unit is configured to allow the vehicle speed to be equal to or higher than the limit vehicle speed and control the drive force generated by the drive device based on the accelerator opening when the accelerator opening becomes a value equal to or larger than an increase reference value larger than a decrease reference value after the accelerator opening has decreased to a value equal to or smaller than the decrease reference value within a predetermined time from a time point when the vehicle speed limitation is released during the vehicle speed limitation being executed by the speed limiting control.

According to the present invention, a vehicle speed limiting method is provided which executes vehicle speed limiting control executing vehicle speed limitation that limits a vehicle speed by controlling a drive force generated by a drive device so that the vehicle speed becomes equal to or lower than a limit vehicle speed in a vehicle in which the drive force generated by the drive device is controlled at least based on an accelerator opening.

The vehicle speed limiting method includes a step of starting vehicle speed limitation by the vehicle speed limiting control when the vehicle speed increases and reaches the limit vehicle speed and a step of allowing the vehicle speed to be equal to or higher the limit vehicle speed and controlling the drive force generated by the drive device based on the accelerator opening when the accelerator opening becomes a value equal to or larger than an increase reference value larger than a decrease reference value after the accelerator opening has decreased to a value equal to or smaller than the decrease reference value within a predetermined time from a time point when the vehicle speed limitation is released during the vehicle speed limitation being executed by the speed limiting control.

According to the vehicle speed limiter and the vehicle speed limiting method described above, the vehicle speed is allowed to increase to or exceed the limit vehicle speed, and the drive force generated by the drive device is controlled based on the accelerator opening when the accelerator opening becomes a value equal to or larger than the increase reference value larger than the decrease reference value after the accelerator opening has decreased to a value equal to or smaller than the decrease reference value within the predetermined time from a time point when the vehicle speed limitation is released during the vehicle speed limitation being executed by the speed limiting control.

Therefore, a driver can increase the vehicle speed so that the vehicle speed becomes equal to or higher than the limit vehicle speed by conducting an accelerator operation so that the accelerator opening becomes a value equal to or larger than the increase reference value after the accelerator opening has decreased to the decrease reference value or lower within the predetermined time from a time point when the vehicle speed limitation is released. Accordingly, the driver can conduct the accelerator operation so that the vehicle speed is allowed to increase beyond the limit vehicle speed, in distinction from the accelerator operation which should prevent the vehicle speed from increasing beyond the limit vehicle speed.

In one aspect of the present invention, the decrease reference value is a value smaller than half of the maximum accelerator opening.

According to the above aspect, the decrease reference value is a value smaller than half of the maximum accelerator opening. Therefore, the driver can reduce the accelerator opening to a value equal to or smaller than the decrease reference value by reducing the accelerator opening to a value smaller than half of the maximum accelerator opening.

In another aspect of the present invention, the decrease reference value is a value smaller by a predetermined amount than a value of the accelerator opening when the accelerator opening starts to decrease.

According to the above aspect, the driver can reduce the accelerator opening to the decrease reference value or smaller by reducing the accelerator opening by an amount equal to or more than the predetermined amount from a value of the accelerator opening when the accelerator opening starts to decrease.

Further, in another aspect of the present invention, the increase reference value is a value larger than half of the maximum accelerator opening and smaller than the maximum accelerator opening.

According to the above aspect, the driver can increase the accelerator opening to the increase reference value or more by increasing the accelerator opening to a value larger than half of the maximum accelerator opening and smaller than the maximum accelerator opening.

Further, in another aspect of the present invention, the vehicle is equipped with a kickdown switch that is turned on when the accelerator opening exceeds a switch reference value, and the switch reference value is larger than the increase reference value.

According to the above aspect, the driver can turn on the kickdown switch and increase the vehicle speed so that the vehicle speed increases to or exceeds the limit vehicle speed by conducting the accelerator operation so that the accelerator opening becomes equal to or higher than the switch reference value. In addition, since the switch reference value is larger than the increase reference value, by conducting the accelerator operation so that the accelerator opening changes as described above, the driver can increase the vehicle speed so as to increase to or exceed the limit vehicle speed without turning on the kickdown switch.

Further, in another aspect of the present invention, the vehicle speed limiter includes a limit vehicle speed setting device, and is configured so that the limit vehicle speed is variably set by the limit vehicle speed setting device.

According to the above aspect, since the limit vehicle speed setting device is included in the vehicle speed limiter, the limit vehicle speed can be variably set by the limit vehicle speed setting device.

Further, in another aspect of the present invention, a vehicle equipped with the above vehicle speed limiter is provided. According to this vehicle, the same operations and benefits as the above-mentioned vehicle speed limiter and vehicle speed limiting method can be obtained.

Other objects, other features and attendant advantages of the present invention will be readily understood from the description of the embodiments of the present invention described with reference to the following drawings.

DETAILED DESCRIPTION

The present invention will now be described in detail with reference to the accompanying drawings.

First Embodiment

Figure 1:
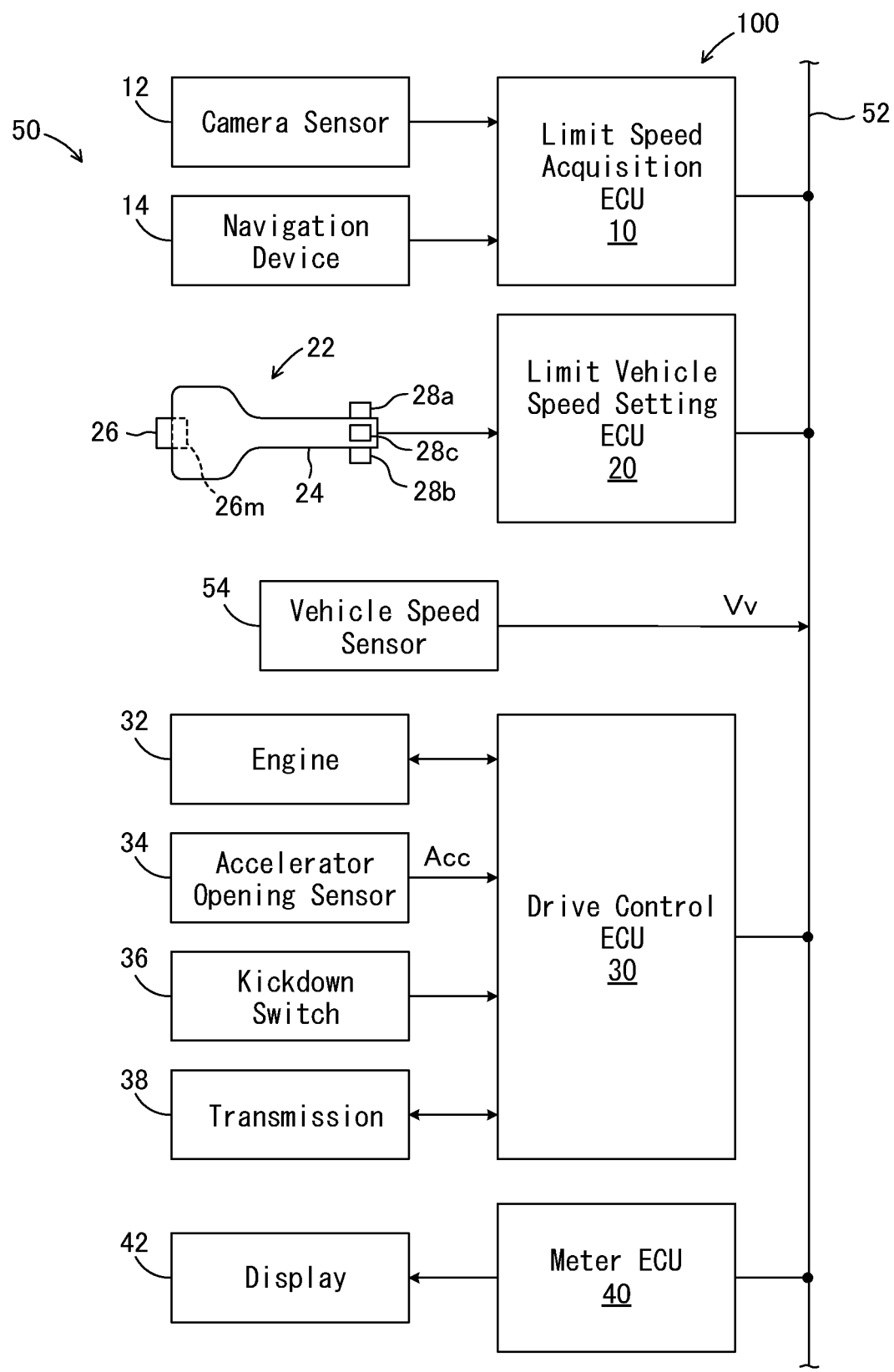
FIG. 1 is a schematic configuration diagram showing an embodiment of a vehicle speed limiter according to the present invention.

As shown in FIG. 1, the vehicle speed limiter 100 according to the first embodiment is configured as an Adjustable Speed Limiter (abbreviated as ASL) and is applied to a vehicle 50 that may be an autonomous vehicle. The speed limiter 100 sets a limit vehicle speed Vvlim, which is an upper limit of a vehicle speed Vv of the vehicle 50, and executes vehicle speed limiting control that controls a drive force of the vehicle so that the vehicle speed does not exceed the limit vehicle speed. The speed limiter 100 of the embodiment includes a limit speed acquisition ECU 10, a limit vehicle speed setting ECU 20, a drive control ECU 30, and a meter ECU 40.

The ECUs 10 to 40 are electronic control units each including a microcomputer as a main part, and are connected to each other via a CAN (Controller Area Network) 52 so as to be able to transmit and receive information to and from each other. Each microcomputer includes a CPU, ROM, RAM, non-volatile memory and an interface. The CPU realizes various functions by executing instructions (programs, routines) stored in the ROM. Some or all of these ECUs may be integrated into one ECU.

The limit speed acquisition ECU 10 is an electronic control device for acquiring a limit speed Vlim at a traveling path where the vehicle 50 is currently traveling, and a camera sensor 12 and a navigation device 14 are connected to the ECU 10. The camera sensor 12 captures images in front of the vehicle 50 and transmits information of the captured images to the limit speed acquisition ECU 10. The limit speed acquisition ECU 10 has an image analysis function, recognizes a road sign (including a road surface sign) from the information of the image received from the camera sensor 12, and determines a limit speed (legal limit speed) Vlim represented by the road sign.

The navigation device 14 includes a GPS receiver that detects a position of the vehicle 50, a storage device that stores map information and road information, and a communication device that acquires the latest information on map information and road information from the outside. The road information includes information on a limit speed Vlim. The navigation device 14 extracts information on a limit speed Vlim indicating a limit speed at a road on which the vehicle is currently traveling based on a position of the vehicle on the map and the road information, and outputs the extracted limit speed information to the limit speed acquisition ECU 10.

In the present embodiment, the camera sensor 12 and the navigation device 14 are provided as devices for acquiring a limit speed, but one of these devices may be omitted. Further, the navigation device 14 may be a wireless communication terminal device that sequentially receives the latest information from an external information providing device without having a storage device for storing map information and road information.

When the limit speed acquisition ECU 10 acquires the limit speed Vlim as described above, it outputs the acquired limit speed to the limit vehicle speed setting ECU 20. If the limit speed acquired from the image captured by the camera sensor 12 and the limit speed acquired from the navigation device 14 do not match, the limit speed acquisition ECU 10 may adopt a limit speed acquired by a preset higher priority device (the camera sensor 12 or the navigation device 14), or adopt the lower or higher of the two limit speeds.

An ASL operator 22 that functions as a limit vehicle speed setting device is connected to the limit vehicle speed setting ECU 20. The ASL operator 22 sets a limit vehicle speed Vvlim, which is an upper limit of the vehicle speed Vv of the vehicle 50, and is an operator operated by a driver for the purpose to determine whether or not to change a limit vehicle speed according to a change in a limit speed Vlim when the limit speed is changed.

The ASL operator 22 includes an operating lever 24. Although not shown in the figures, the operating lever 24 is attached to a steering column behind a steering wheel at its base and has a tip portion extending radially outward of the steering wheel. The operating lever 24 can be swung upward, downward, and toward the front when viewed from the driver. The ASL operator 22 includes a main switch 26m provided at the tip of the operating lever 24, a resume/speed increasing switch 28a, a set/speed decreasing switch 28b, and a cancel switch 28c that are turned on by operating the operating lever.

The main switch 26m is a main power switch that alternately switches on and off each time an operation button 26 provided at the tip of the operating lever 24 is pressed. The switches 28a to 28c are turned on only while the operating lever 24 is swung upward, downward, and toward the front, respectively. When the driver releases the operating lever 24, the operating lever returns to its standard position and all the switches 28a to 28c are turned off.

The limit vehicle speed setting ECU 20 is an electronic control unit that determines a limit vehicle speed Vvlim based on a limit speed Vlim output from the limit speed acquisition ECU 10 and a switch signal output from the ASL operator 22. The limit vehicle speed setting ECU 20 executes vehicle speed limiting control when the main switch 26m of the ASL operator 22 is on, and does not execute vehicle speed limiting control when the main switch 26m is off. The control of a drive force for the vehicle speed limiting control is executed by the drive control ECU 30. Therefore, as will be described in detail later, the limit vehicle speed setting ECU 20 causes the drive control ECU 30 to execute a drive force limiting control by instructing the drive control ECU 30 with a target drive force Fdt based on the limit vehicle speed Vvlim.

A vehicle speed sensor 54 that detects a vehicle speed Vv is connected to the CAN 52. The vehicle speed sensor 54 may be connected to the limit vehicle speed setting ECU 20 or the drive control ECU 30. The limit vehicle speed setting ECU 20 sets as a limit vehicle speed Vvlim an actual vehicle speed (vehicle speed Vv detected by the vehicle speed sensor 54) at a time point when the set/speed decreasing switch 28b is turned on in a situation where the main switch 26m is on and the limit vehicle speed Vvlim is not set. When the set/speed decreasing switch 28b is turned on in a situation where the limit vehicle speed is set, the limit vehicle speed setting ECU 20 decreases the limit vehicle speed by a decrease amount determined according to a lever operation period. Further, when the resume/speed increasing switch 28a is turned on in a situation where the limit vehicle speed is set, the limit vehicle speed setting ECU 20 increases the limit vehicle speed by an increase amount determined according to a lever operation period.

For details on the operation of the ASL operator 22, particularly the setting and increase/decrease of the limit speed by the resume/speed increasing switch 28a, the set/decreasing switch 28b and the cancel switch 28c, refer to Japanese Patent Application Laid-Open No. 2017-001406 according to the application of the applicant of the present application, if necessary.

The limit vehicle speed setting ECU 20 has a function to set automatically the limit vehicle speed Vvlim based on the limit speed Vlim acquired from the limit speed acquisition ECU 10, in addition to the function of setting and changing the limit vehicle speed Vvlim by operating the ASL operator 22 as described above. For example, the limit vehicle speed setting ECU 20 sets a limit vehicle speed using a limit speed acquired from the limit speed acquisition ECU 10, and changes the limit vehicle speed accordingly each time a change in the limit speed is detected.

Even when a limit vehicle speed is set based on a limit speed as described above, the driver can adjust the limit vehicle speed by operating the ASL operator 22. The limit vehicle speed setting ECU 20 finally transmits the limit vehicle speed adjusted by the driver to the drive control ECU 30 and the meter ECU 40. In this connection, the limit vehicle speed setting ECU 20 transmits the limit vehicle speed at a predetermined cycle while the main switch 26m of the ASL operator 22 is on and the limit vehicle speed is set.

The drive control ECU 30 controls a drive force of the engine 32 so that the vehicle speed Vv of the vehicle 50 does not exceed the limit vehicle speed Vvlim while the limit vehicle speed is transmitted from the limit vehicle speed setting ECU 20 at a predetermined cycle. An accelerator opening sensor 34 that detects an accelerator opening Acc (0 to 100%) and a kickdown switch 36 are connected to the drive control ECU 30. The drive control ECU 30 calculates a driver's required drive force Fdd in a manner known in the art based on the vehicle speed Vv detected by the vehicle speed sensor 54 and the accelerator opening Acc detected by the accelerator opening sensor 34.

The limit vehicle speed setting ECU 20 determines the limit vehicle speed Vvlim based on the limit speed Vlim and the switch signal output from the ASL operator 22, and further, in a manner known in the art, calculates a limit drive force Fdlim for setting the vehicle speed Vv to the limit vehicle speed Vvlim.

The limit vehicle speed setting ECU 20 determines whether or not an overriding accelerator operation is performed by the driver so that the vehicle speed exceeds the limit vehicle speed, as will be described in detail later with reference to FIG. 3. The limit vehicle speed setting ECU 20 sets a target drive force Fdt of the vehicle 50 to the required drive force Fdd when the required drive force Fdd is smaller than the limit drive force Fdlim and when the required drive force Fdd is equal to or higher than the limit drive force Fdlim and the overriding accelerator operation is being conducted. On the other hand, the limit vehicle speed setting ECU 20 sets the target drive force Fdt of the vehicle 50 to the limit drive force Fdlim when the required drive force Fdd is equal to or higher than the limit drive force Fdlim and the overriding accelerator operation is not conducted.

The limit vehicle speed setting ECU 20 outputs a signal indicating the target drive force Fdt to the drive control ECU 30, and the drive control ECU 30 controls the engine 32 so that the drive force Fd of the vehicle 50 becomes the target drive force Fdt. In this connection, when the drive force Fd of the vehicle is reduced, the drive control ECU 30 reduces an opening degree of a throttle valve that adjusts an intake air amount of the engine 32, or reduces a fuel injection amount to the engine 32. The drive control ECU 30 controls a transmission stage of the transmission 38 as needed. Further, the drive control ECU 30 controls a shift stage of the transmission 38 to shift down when the accelerator opening Acc becomes 100% and the kickdown switch 36 is turned on.

In the embodiment, the drive device that generates the drive force Fd of the vehicle 50 is the engine 32 and the transmission 38. However, the drive device may be any drive device known in the art, such as a so-called hybrid system that is a combination of an engine and a motor, a so-called plug-in hybrid system, a combination of a fuel cell and a motor, and a motor.

A display 42 provided at a position visible from the driver's seat is connected to the meter ECU 40. When the vehicle speed limiting control is being executed, the meter ECU 40 displays the limit vehicle speed Vvlim transmitted from the limit vehicle speed setting ECU 20 on the display 42. As a result, the driver can recognize that the vehicle speed limiting control is being executed and the limit vehicle speed Vvlim of the vehicle speed limiting control. Further, when it is determined by the limit vehicle speed setting ECU 20 that the overriding accelerator operation is performed by the driver, an indication that the overriding accelerator operation is performed may be displayed on the display 42.

Figure 2:
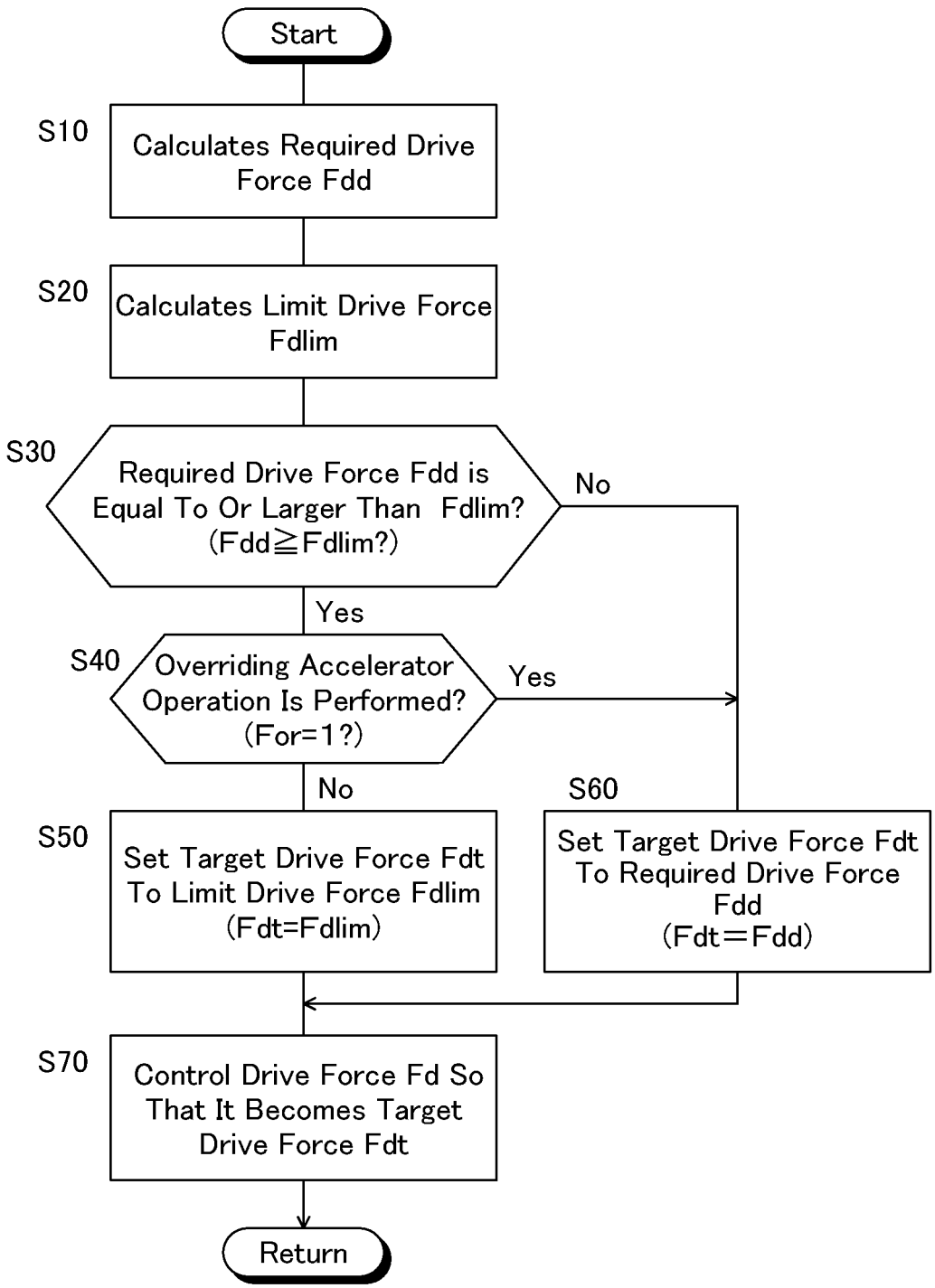
FIG. 2 is a flowchart showing a speed limiting control routine in the embodiments.

As will be described in detail later, the ROM of the limit vehicle speed setting ECU 20 stores the vehicle speed limiting control and overriding determination programs corresponding to the flowcharts shown in FIGS. 2 and 3, respectively. The CPU of the limit vehicle speed setting ECU 20 executes vehicle speed limiting control and overriding determination control according to these programs.

<Vehicle Speed Limiting Control Routine>

Next, the vehicle speed limiting control routine in the first embodiment and the second and third embodiments described later will be described with reference to the flowchart shown in FIG. 2. The vehicle speed limiting control according to the flowchart shown in FIG. 2 is executed by the CPU of the limit vehicle speed setting ECU 20 and the CPU of the drive control ECU 30 repeatedly at a predetermined control cycle when the main switch 26m of the ASL operator 22 shown in FIG. 1 is on.

First, in step S10, the CPU of the drive control ECU 30 calculates a driver's required drive force Fdd based on a vehicle speed Vv detected by the vehicle speed sensor 54 and an accelerator opening Acc detected by the accelerator opening sensor 34.

The steps S20 to S60 are executed by the CPU of the limit vehicle speed setting ECU 20. In step S20, the CPU determines a limit vehicle speed Vvlim based on a limit speed Vlim output from the limit speed acquisition ECU 10 and a switch signal output from the ASL operator 22. Further, the CPU calculates a limit drive force Fdlim for setting a vehicle speed Vv to the limit vehicle speed Vvlim.

In step S30, the CPU determines whether or not the driver's required drive force Fdd is equal to or larger than the limit drive force Fdlim. When a negative determination is made, the CPU advances the vehicle speed limiting control to step S60, and when an affirmative determination is made, the CPU advances the vehicle speed limiting control to step S40.

In step S40, the CPU determines whether or not the overriding accelerator operation is performed by the driver so that the vehicle speed exceeds the limit vehicle speed by determining whether or not a flag For is 1. When an affirmative determination is made, the CPU advances the vehicle speed limiting control to step S60, and when a negative determination is made, the CPU advances the vehicle speed limiting control to step S50. The flag For is initialized to 0 at the start of vehicle speed limiting control, and then set to 0 or 1 according to the flowchart shown in FIG. 3 as described later.

In step S50, the CPU sets a target drive force Fdt of the vehicle 50 to the limit drive force Fdlim, and in step S60, the CPU sets a target drive force Fdt of the vehicle 50 to the required drive force Fdd of the driver.

In step S70, the CPU of the limit vehicle speed setting ECU 20 outputs a signal indicating the target drive force Fdt to the drive control ECU 30. As a result, the CPU of the drive control ECU 30 controls the output of the engine 32 or the output of the engine 32 and the shift stage of the transmission 36 so that the drive force Fd of the vehicle 50 becomes the target drive force Fdt.

<Overriding Determination Control Routine>

Next, the overriding determination control routine in the first embodiment will be described with reference to the flowchart shown in FIG. 3. The overriding determination control according to the flowchart shown in FIG. 3 is executed by the CPU of the limit vehicle speed setting ECU 20 repeatedly in a predetermined control cycle when the main switch 26m of the ASL operator 22 is on. In the following description, the overriding determination control is simply referred to as "the present control".

First, in step S110, the CPU determines whether or not the flag For is 0. When a negative determination is made, the CPU advances the present control to step S260, and when an affirmative determination is made, the CPU advances the present control to step S120.

In step S120, the CPU determines whether or not the accelerator opening Acc is increasing. When an affirmative determination is made, the CPU advances the present control to step S200, and when a negative determination is made, the CPU advances the present control to step S130.

In step S130, the CPU determines whether or not a flag Fa is 1, that is, whether or not it is determined that the vehicle speed limitation has already been released in step S150 described later. When an affirmative determination is made, the CPU advances the present control to step S170, and when a negative determination is made, the CPU advances the present control to step S140.

In step S140, the CPU determines whether or not the accelerator opening Acc is decreasing. When a negative determination is made, the CPU temporarily terminates the present control, and when an affirmative determination is made, the CPU advances the present control to step S150.

In step S150, the CPU determines whether or not the vehicle speed limitation is released during the vehicle speed limitation by the vehicle speed limitation control. When a negative determination is made, the CPU temporarily terminates the present control, and when an affirmative determination is made, the CPU advances the present control to step S160. It may be determined that the vehicle speed limitation is released when the vehicle speed Vv decreases and becomes smaller than the limit vehicle speed Vvlim by reducing the accelerator opening Acc. Further, when the accelerator opening Acc becomes smaller than a limit accelerator opening Acclim determined by the limit vehicle speed Vvlim, it may be determined that the vehicle speed limitation is released.

In step S160, the flag Fa is set to 1, and a time point when the affirmative determination is made in step S150, that is, a time point when it is determined that the vehicle speed limitation is released is set as a reference time point.

In step S170, the CPU determines whether or not an elapsed time from the reference time point is within a reference elapsed time (predetermined time) Δtc and the accelerator opening Acc has decreased to a decrease reference value Accd or smaller. When a negative determination is made, the CPU resets a flag Fb to 0 in step S180, and when an affirmative determination is made, the CPU sets the flag Fb to 1 in step S190. When the flag Fb is 1, it means that it is determined that the accelerator opening Acc has decreased to the decrease reference value Accd or smaller within the reference elapsed time Δtc from the reference time point.

The reference elapsed time Δtc may be 1.5 to 2.5 seconds, preferably 2 seconds, and the decrease reference value Accd may be ½ or smaller of the maximum value (100%) of the accelerator opening Acc, for example. It may be 5 to 30%, preferably 10%.

In step S200, the CPU determines whether or not the accelerator opening Acc is equal to or larger than an increase reference value Acci and a rate of increase of the accelerator opening Acc is 100%/sec or higher. When an affirmative determination is made, the CPU advances the present control to step S230, and when a negative determination is made, the CPU advances the present control to step S210. The increase reference value Acci may be a value larger than half of the maximum value (100%) of the accelerator opening Acc and smaller than 100%, for example, 60 to 90%, preferably 90%.

In step S210, the CPU determines whether or not the flag Fb is 1. When a negative determination is made, the CPU temporarily terminates the present control, and when an affirmative determination is made, the CPU advances the present control to step S220.

In step S220, the CPU determines whether or not an elapsed time from the reference time point is within the reference elapsed time Δtc and the accelerator opening Acc is equal to or larger than the increase reference value Acci. When an affirmative determination is made, it may be determined that the overriding accelerator operation has been performed by the driver. Therefore, the CPU sets the flag For to 1 in step S230. When a negative determination is made, the CPU advances the present control to step S240.

In step S240, the CPU determines whether or not the elapsed time from the reference time point is equal to or larger than the reference elapsed time Δtc. When a negative determination is made, the CPU temporarily terminates the present control, and when an affirmative determination is made, the CPU resets the flag Fb to 0 in step S250.

In step S260, the CPU determines whether or not the accelerator opening Acc is smaller than an end reference value Acce for determining an end of override and the vehicle speed Vv is lower than the limit vehicle speed Vvlim. When a negative determination is made, the CPU temporarily terminates the present control, and when an affirmative determination is made, the CPU resets the flags Fa and For to 0 in step S270. The end reference value Acce for determining the end of the overriding may be, for example, 40 to 60%, preferably 60%.

As can be seen from the above description, in the vehicle speed limitation control, in step S10, a required drive force Fdd of the driver is calculated based on the vehicle speed Vv and the accelerator opening Acc. In step S20, the limit vehicle speed Vvlim is determined based on the limit speed Vlim output from the limit speed acquisition ECU 10 and the switch signal output from the ASL operator 22, and a limit drive force Fdlim for setting the vehicle speed Vv to the limit vehicle speed Vvlim is calculated.

When the required drive force Fdd of the driver is smaller than the limit drive force Fdlim, a negative determination is made in step S30, and in step S60, the target drive force Fdt of the vehicle 50 is set to the required drive force Fdd of the driver.

On the other hand, when the required drive force Fdd of the driver is equal to or larger than the limit drive force Fdlim, an affirmative determination is made in step S30. When the overriding accelerator operation is not performed and the flag For is 0, a negative determination is made in step S40, and the target drive force Fdt of the vehicle 50 is set to the limit drive force Fdlim in step S50.

Further, when the required drive force Fdd of the driver is equal to or larger than the limit drive force Fdlim, the overriding accelerator operation is performed and the flag For is 1, affirmative determinations are made in steps S30 and S40, and the target drive force Fdt of the vehicle 50 is set to the required drive force Fdd of the driver in step S60. Therefore, it is permissible that the vehicle speed Vv exceeds the limit vehicle speed Vvlim.

Figure 3:
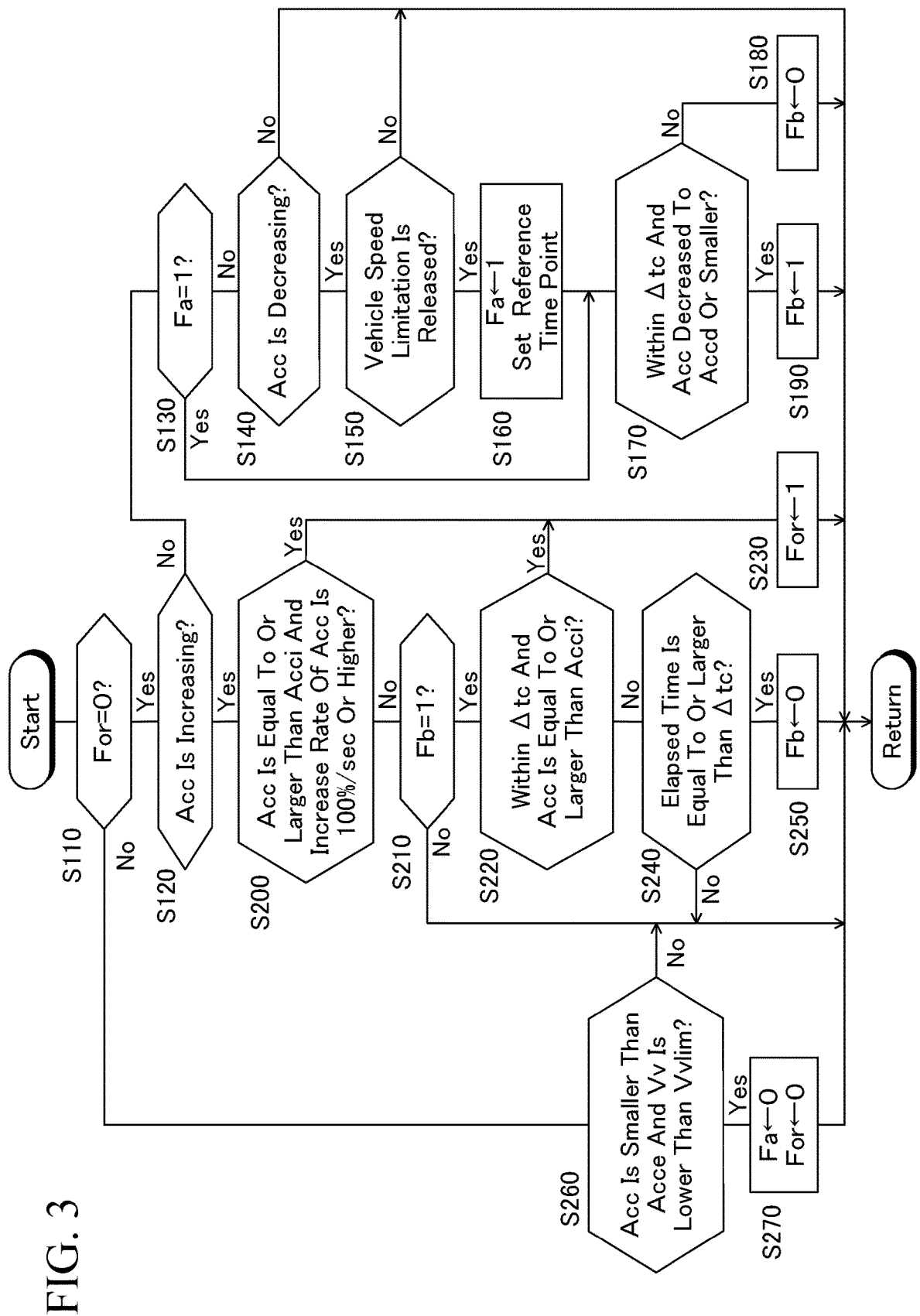
FIG. 3 is a flowchart showing a control routine for overriding determination in a first embodiment.

As shown in FIG. 3, the flag For is set to 1 in cases C1 and C2 below. Therefore, in the cases C1 and C2 described below, the target drive force Fdt is set to the required drive force Fdd of the driver even if the required drive force Fdd of the driver is equal to or larger than the limit drive force Fdlim.

<C1: When the Accelerator Opening Acc is Once Reduced to Accd or Smaller and then Increased to Nearly 100% within ΔTc from the Reference Time Point>

First, a negative determination is made in step S120, a negative determination, an affirmative determination and an affirmative determination are made in steps S130 to S150, respectively, and in step S160, the flag Fa is set to 1 and the reference time point is set. After that, a negative determination is made in step S120, affirmative determinations are made in steps S130 and S170, and the flag Fb is set to 1 in step S190.

Further, affirmative determinations are made in steps S110 and S120, a negative determination is made in step S200, affirmative determinations are made in steps S210 and S220, and the flag For is set to 1 in step S230.

Therefore, when the following conditions 1 to 3 are satisfied, it is determined that the overriding accelerator operation is being performed, and the flag For is set to 1.

Condition 1: The vehicle speed limitation was released while the vehicle speed was limited.

Condition 2: The accelerator opening Acc decreased to the decrease reference value Accd or smaller within the reference elapsed time Δtc from the reference time point, that is, the time point when the condition 1 was satisfied.

Condition 3: After the condition 2 is satisfied, the accelerator opening Acc increases to the increase reference value Acci or larger within the reference elapsed time Δtc from the reference time point.

<C2: When the Accelerator Opening Acc is Rapidly Increased to Nearly 100%>

Affirmative determinations are made in steps S110, S120 and S200, and the flag For is set to 1 in step S230. Therefore, it is not necessary to temporarily reduce the accelerator opening Acc as in the case C1, and when the following condition 4 is satisfied, it is determined that the overriding accelerator operation is being performed, and the flag For is set to 1.

Condition 4: The accelerator opening Acc was increased to the increase reference value Acci or larger at an increase rate of the reference value 100%/sec or larger.

In any of C1 and C2, when an affirmative determination is made in step S260, that is, when the following condition 5 is satisfied, it is determined that the overriding accelerator operation is completed, and the flag For is reset to 0.

Condition 5: The accelerator opening Acc is smaller than the end reference value Acce of the overriding, and the vehicle speed Vv is lower than the limit vehicle speed Vvlim.

<C3: When the Kickdown Switch 36 is Turned On>

Although not shown in the flowchart, when the accelerator opening Acc is increased to 100%, the kickdown switch 36 is turned on, and the drive control ECU 30 shifts down the transmission 38 to increase the drive force of the vehicle. Notably, the kickdown switch 36 may be omitted.

Next, a specific example of the case C1 will be described with reference to FIG. 6. The uppermost row of FIG. 6 shows the vehicle speed Vv, the second row shows the accelerator opening Acc, the third row shows the on/off of the kickdown switch 36, and the lowermost row shows the required drive force Fdd of the driver, the limit drive force Fdlim and the target drive force Fdt.

Figure 6:
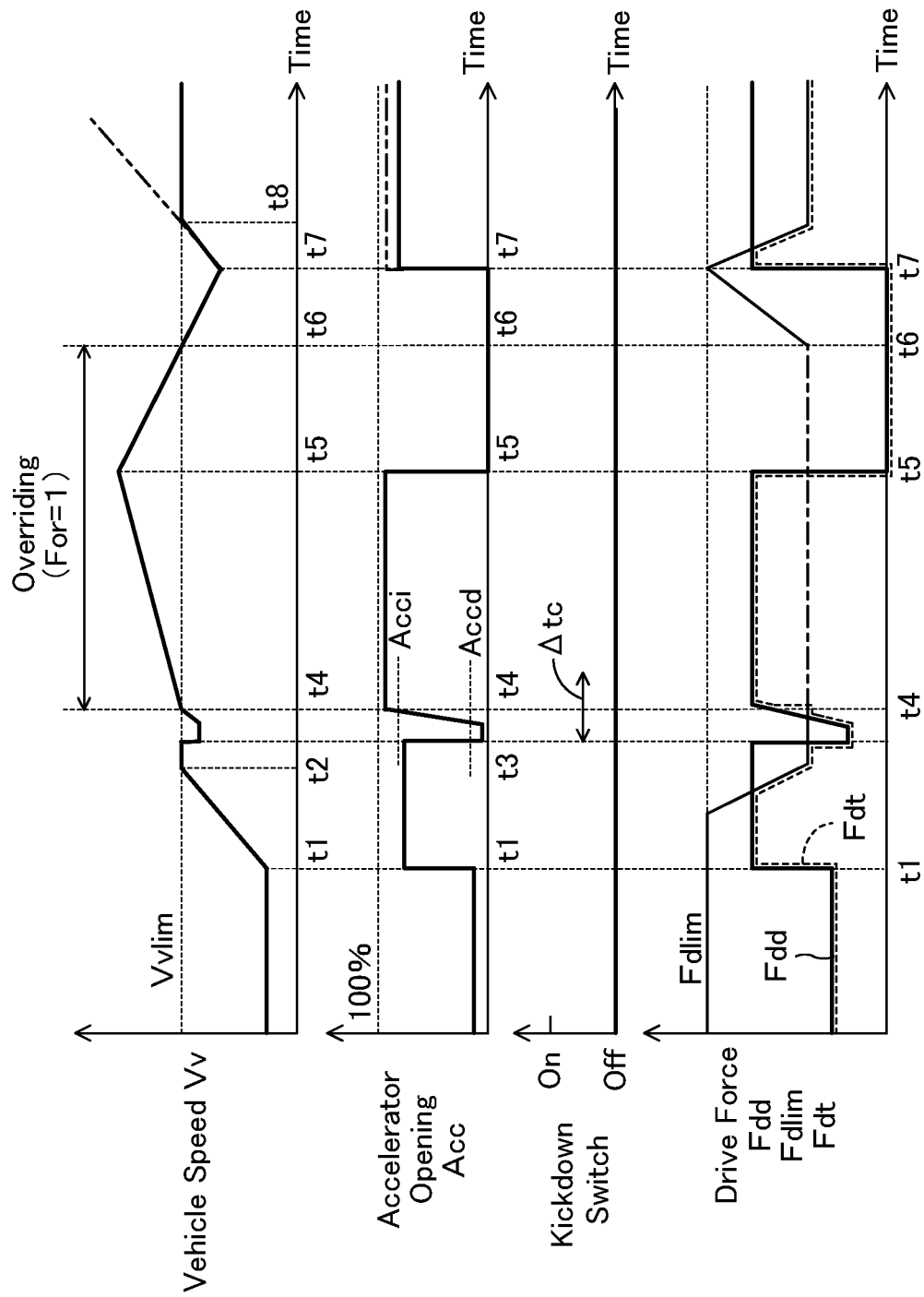
FIG. 6 is a time chart showing a specific example of an operation of the first embodiment.

As shown in FIG. 6, it is assumed that at a time point t1, the accelerator opening Acc is increased by the driver to a value smaller than the increase reference value Acci, and the vehicle speed Vv is gradually increased until the limit vehicle speed Vvlim is reached at a time point t2 by increasing the required drive force Fdd of the driver.

Further, it is assumed that the driver starts reducing the accelerator opening Acc at a time point t3, and immediately after the time point t3, the accelerator opening Acc is reduced to a value smaller than the decrease reference value Accd. The time point t3 is the reference time point. It is assumed that the accelerator opening Acc is increased to the increase reference value Acci or larger at a time point t4 before the reference elapsed time Δtc elapses from the time point t3, and is maintained at a value equal to the Acci or larger and smaller than 100% until a time point t5 is reached. Since the accelerator opening Acc is equal to the Acci or larger and smaller than 100%, the kickdown switch 36 is not turned on.

Further, it is assumed that the accelerator opening Acc is reduced to 0% from the time point t5 to a time point t7, so that the required drivie force Fdd of the driver becomes 0, and at a time point t6, the vehicle speed Vv becomes equal to or smaller than the limit vehicle speed Vvlim.

The event from the time point t3 to the time point t4 is the event in the above case C1, and the event at the time point t6 is the event in which an affirmative determination is made in the above step S260. Therefore, it is determined that the overriding accelerator operation is being performed and the flag For is set to 1 from the time point t4 to the time point t6. Therefore, the vehicle speed Vv becomes the limit vehicle speed Vvlim or higher from the time point t4 to the time point t6, and becomes the maximum value at the time point t5. Further, at the time point t6, the vehicle speed limitation is resumed.

Further, it is assumed that the required drive force Fdd of the driver is also rapidly increased by rapidly increasing the accelerator opening Acc to a value smaller than the increase reference value Acci at an increase rate of 100%/sec or higher at the time point t7. However, since the accelerator opening Acc is a value smaller than the increase reference value Acci, negative determinations are made in steps S200 and S210, and the flag For is maintained at 0. Therefore, since a negative determination is made in step S40, the vehicle speed Vv is limited to the limit vehicle speed Vvlim even after the time point t7.

As shown by the virtual line in FIG. 6, when the accelerator opening Acc is rapidly increased to a value of the increase reference value Acci or larger at an increase rate of the reference value of 100%/sec or higher at the time point t7 (in the above case C2), an affirmative determination is made in step S200. Therefore, since the flag For is set to 1 in step S230, the vehicle speed Vv becomes equal to or higher than the limit vehicle speed Vvlim after a time point t8, for example.

Second Embodiment

Figure 4:
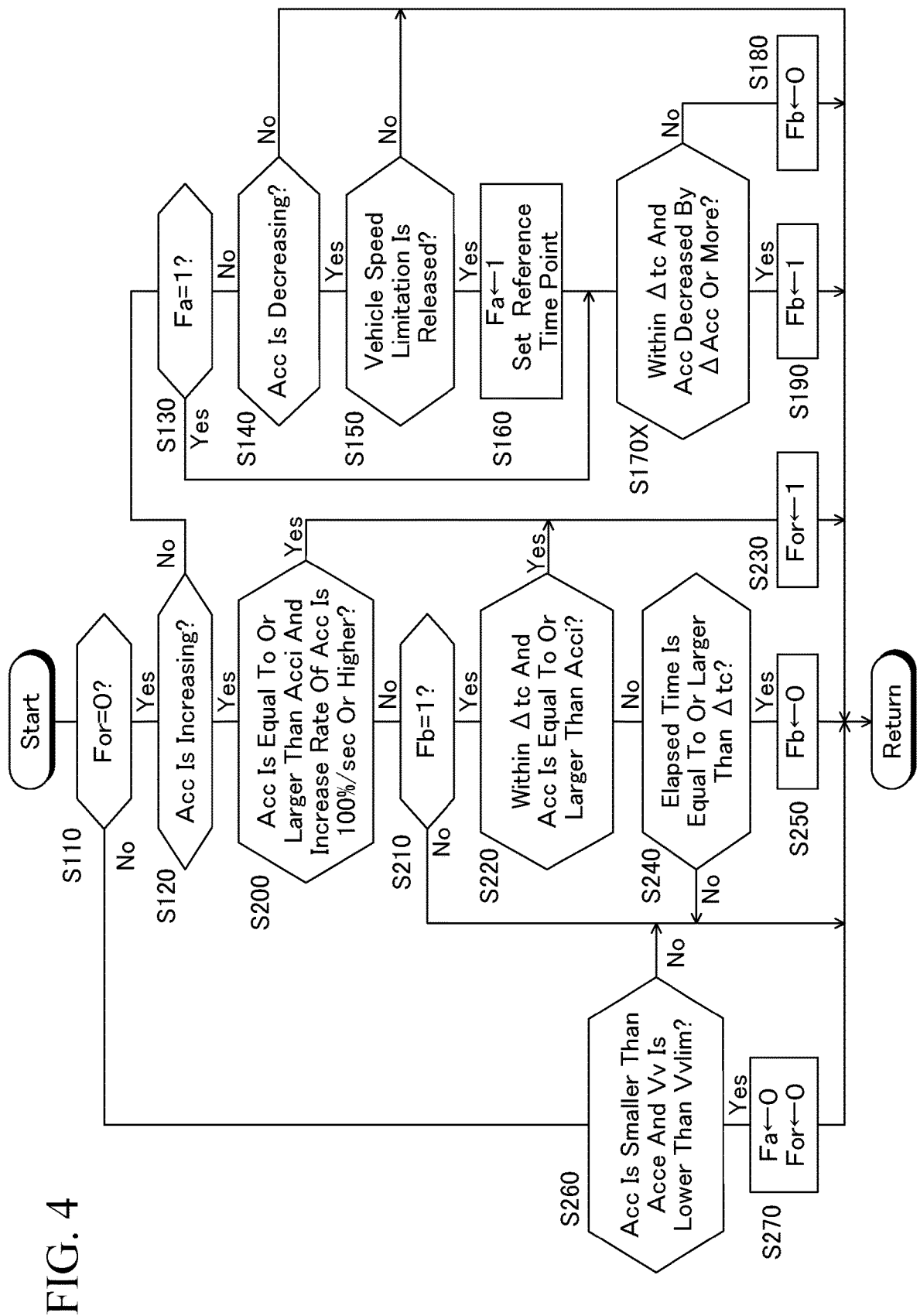
FIG. 4 is a flowchart showing a control routine for overriding determination in a second embodiment.

FIG. 4 is a flowchart showing an overriding determination control routine in the second embodiment of the vehicle speed limiter according to the present invention. In FIG. 4, the same step numbers as those shown in FIG. 3 are assigned to the same steps as those shown in FIG. 3. This also applies to the third embodiment described later.

In the second embodiment, step S170X is executed instead of step S170. In step S170X, the CPU of the limit vehicle speed setting ECU 20 determines whether or not an elapsed time from the reference time point is within the reference elapsed time Δtc and an accelerator opening Acc has decreased by a predetermined amount ΔAcc or more from a value at the reference time point. When a negative determination is made, the CPU resets the flag Fb to 0 in step S180, and when an affirmative determination is made, the CPU sets the flag Fb to 1 in step S190. Steps other than step S170X are executed in the same manner as in the first embodiment. The predetermined amount ΔAcc may be, for example, a constant of 40 to 60%, preferably 50%.

Therefore, according to the second embodiment, when the following condition 2' is satisfied in addition to the above-mentioned conditions 1 and 3, it is determined that the overriding accelerator operation is performed, and the flag For is set to 1.

Condition 2': The accelerator opening Acc decreased by the predetermined amount ΔAcc or more from a value at the reference time point within the reference elapsed time Δtc from the reference time point, that is, the time point when the condition 1 was satisfied.

Third Embodiment

Figure 5:
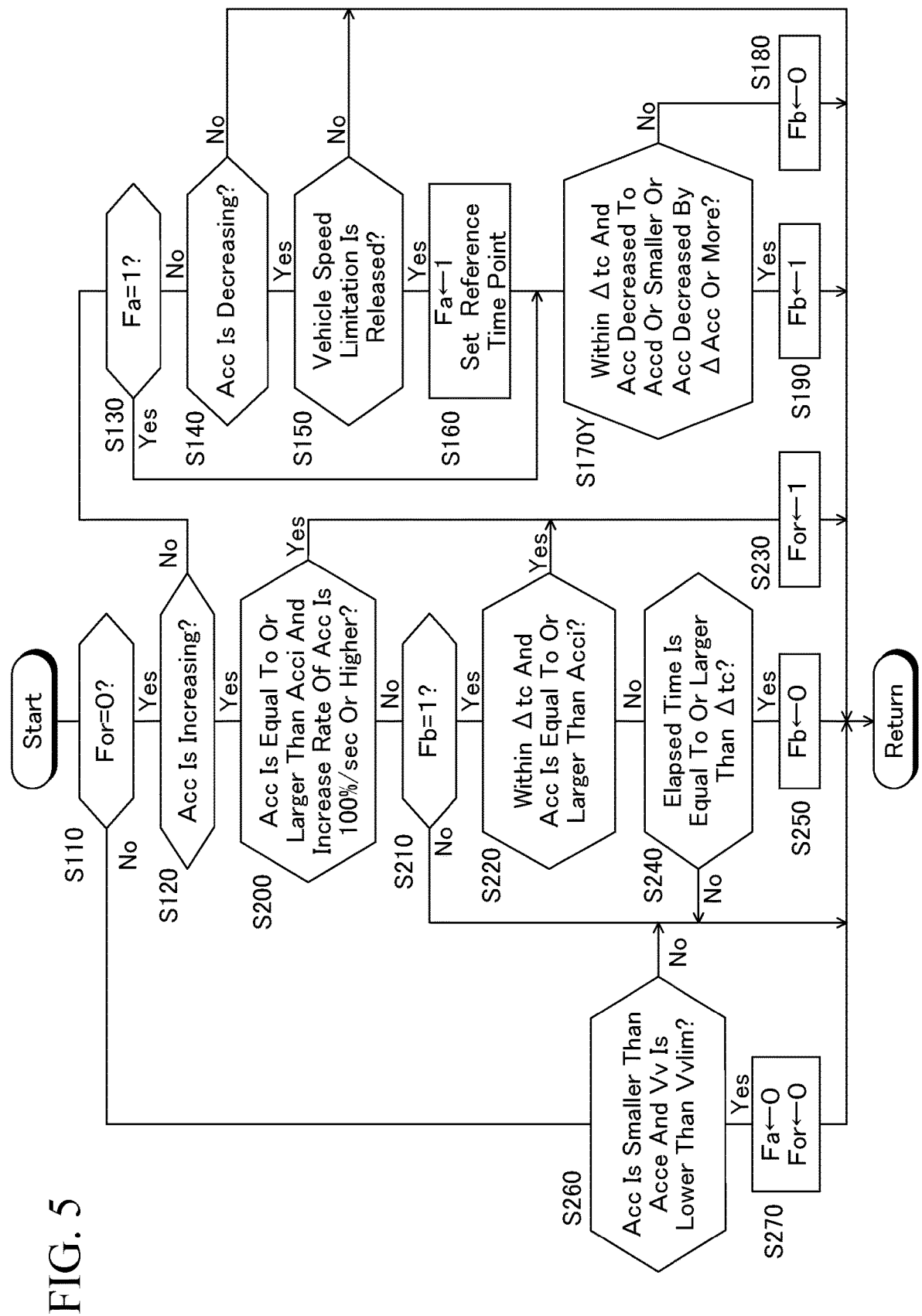
FIG. 5 is a flowchart showing a control routine for overriding determination in a third embodiment.

FIG. 5 is a flowchart showing an overriding determination control routine in the third embodiment of the vehicle speed limiter according to the present invention.

In the third embodiment, step S170Y is executed instead of step S170. In step S170Y, the CPU of the limit vehicle speed setting ECU 20 determines whether or not the elapsed time from the reference time point is within the reference elapsed time Δtc and the accelerator opening Acc has decreased to the decrease reference value Accd or smaller, or whether or not the accelerator opening Acc has decreased by the predetermined amount ΔAcc or more from a value at the reference time point. When a negative determination is made, the CPU resets the flag Fb to 0 in step S180, and when an affirmative determination is made, the CPU sets the flag Fb to 1 in step S190. Steps other than step S170Y are executed in the same manner as in the first embodiment.

Therefore, according to the third embodiment, when the above condition 2 or 2' is satisfied in addition to the above conditions 1 and 3, it is determined that the overriding accelerator operation is performed, and the flag For is set to 1.

As can be seen from the above descriptions, according to the first to third embodiments, when the accelerator opening decreases to or below the decrease reference value and then becomes the increase reference value that is larger than the decrease reference value or larger within the predetermined time from the time point when the vehicle speed limitation is released during the vehicle speed limitation by the speed limitation control, the vehicle speed is allowed to increase to or exceed the limit vehicle speed, and the drive force generated by the drive device is controlled based on the accelerator opening.

Therefore, the driver can increase the vehicle speed Vv so as to be equal to or higher than the limit vehicle speed Vvlim by conducting the accelerator operation so that the accelerator opening Acc decreases to or below the decrease reference value Accd and then becomes the increase reference value Acci or larger within the predetermined time from the time point when the limit vehicle speed is released. Accordingly, the driver can conduct the accelerator operation so that the vehicle speed is allowed to increase beyond the limit vehicle speed, in distinction from the accelerator operation which should prevent the vehicle speed from increasing beyond the limit vehicle speed.

According to the first and third embodiments, the decrease reference value Accd is a value smaller than half of the maximum accelerator opening. Therefore, the driver can reduce the accelerator opening to a value equal to or smaller than the decrease reference value by reducing the accelerator opening to a value smaller than half of the maximum accelerator opening.

According to the second and third embodiments, the driver can reduce the accelerator opening Acc to the decrease reference value Accd or smaller by reducing the accelerator opening by an amount equal to or more than the predetermined amount ΔAcc from a value of the accelerator opening when the accelerator opening starts to decrease.

Further, according to the first to third embodiments, the driver can increase the accelerator opening Acc to or exceed to increase reference value Acci or more by increasing the accelerator opening to a value larger than half of the maximum accelerator opening and smaller than the maximum accelerator opening.

Further, according to the first to third embodiments, the driver can turn on the kickdown switch 36 and increase the vehicle speed Vv so that the vehicle speed increases to the limit vehicle speed or more by conducting the accelerator operation so that the accelerator opening Acc becomes equal to or larger than the switch reference value. In addition, since the switch reference value is larger than the increase reference value Acci, by conducting the accelerator operation so that the accelerator opening changes as described above, the driver can increase the vehicle speed Vv so as to increase to or exceed the limit vehicle speed Vvlim without turning on the kickdown switch 36.

Further, according to the first to third embodiments, since the ASL operator 22 that functions as the limit vehicle speed setting device is provided, the limit vehicle speed can be variably set by operating the ASL operator 22.

Further, according to the first to third embodiments, in step S200, when it is determined that the accelerator opening Acc is equal to or larger than the increase reference value Acci and the rate of increase in the accelerator opening Acc is 100%/sec or higher, the flag For is set to 1 in step S230. Therefore, the driver can increase the vehicle speed Vv so that the vehicle speed becomes equal to or higher than the limit vehicle speed Vvlim by conducting the accelerator operation at an increase rate of the accelerator opening Acc of 100%/sec or higher so that the accelerator opening Acc becomes or exceeds the increase reference value Acci.

The vehicle speed limiting method includes a step (S30 and S50) of starting vehicle speed limitation by the vehicle speed limiting control when the vehicle speed increases and reaches the limit vehicle speed and a step (S40, S60 and S70) of allowing the vehicle speed to exceed the limit vehicle speed and controlling the drive force generated by the drive device based on the accelerator opening Acc when the accelerator opening becomes a value equal to or larger than an increase reference value Acci larger than a decrease reference value Accd after the accelerator opening has decreased to a value equal to or smaller than the decrease reference value within a predetermined time Δtc from a time point when the vehicle speed limitation is released during the vehicle speed limitation being executed by the speed limiting control.

As described above, it is determined in steps S70 and S220 whether or not the accelerator opening Acc decreases to or below a decrease reference value Accd and then increases to or exceeds an increase reference value Acci which is larger than the decrease reference value within a predetermined time Δtc from a time point when the vehicle speed limitation is released during the vehicle speed limitation being executed by the vehicle speed limiting control.

Although the present invention has been described in detail with reference to specific embodiments, it will be apparent to those skilled in the art that the present invention is not limited to the above-described embodiments, and various other embodiments are possible within the scope of the present invention.

For example, in the above-described first to third embodiments, the limit speed acquisition ECU 10 is provided that acquires a limit speed Vlim and outputs the acquired limit speed to the limit vehicle speed setting ECU 20. However, the speed limiter of the present invention may be applied to a vehicle not provided with the limit speed acquisition ECU 10.

In the above-described first to third embodiments, the ASL operator 22 is provided that is operated by a driver to set the limit vehicle speed Vvlim, which is an upper limit of the vehicle speed Vv of the vehicle 50, and to determine whether or not to change the limit speed in response to a change in the limit speed when the limit speed is changed. However, the speed limiter of the present invention may be applied to a vehicle in which the ASL operator 22 is not provided and the limit vehicle speed Vvlim is constant.

Further, in the above-described first to third embodiments, the flag For is set to 1 in step S230 when it is determined in step S200 that the accelerator opening Acc is equal to or larger than the increase reference value Acci and the rate of increase in the accelerator opening Acc is 100%/sec or higher. However, step S200 may be omitted.

What is claimed is:

1. A vehicle speed limiter which has a drive device that generates a drive force and an electronic control unit that controls a drive force generated by the drive device based on at least an accelerator opening, and the electronic control unit is configured to perform speed limiting control executing vehicle speed limitation that limits a vehicle speed by controlling the drive force generated by the drive device so that the vehicle speed becomes equal to or lower than a limit vehicle speed, wherein the electronic control unit is configured to allow the vehicle speed to be equal to or higher than the limit vehicle speed and control the drive force generated by the drive device based on the accelerator opening when the accelerator opening becomes a value equal to or larger than an increase reference value larger than a decrease reference value after the accelerator opening has decreased to a value equal to or smaller than the decrease reference value within a predetermined time from a time point when the vehicle speed limitation is released during the vehicle speed limitation being executed by the speed limiting control.

2. The vehicle speed limiter according to claim 1, wherein the decrease reference value is a value smaller than half of the maximum accelerator opening.

3. The vehicle speed limiter according to claim 1, wherein the decrease reference value is a value smaller by a predetermined amount than a value of the accelerator opening when the accelerator opening starts to decrease.

4. The vehicle speed limiter according to claim 1, wherein the increase reference value is a value larger than half of the maximum accelerator opening and smaller than the maximum accelerator opening.

5. The vehicle speed limiter according to claim 1, wherein the vehicle is equipped with a kickdown switch that is turned on when the accelerator opening exceeds a switch reference value, and the switch reference value is larger than the increase reference value.

6. The vehicle speed limiter according to claim 1, wherein the vehicle speed limiter includes a limit vehicle speed setting device, and is configured so that the limit vehicle speed is variably set by the limit vehicle speed setting device.

7. A vehicle equipped with the vehicle speed limiter according to claim 1.

8. A vehicle speed limiting method which executes vehicle speed limiting control executing vehicle speed limitation that limits a vehicle speed by controlling a drive force generated by a drive device so that the vehicle speed becomes equal to or lower than a limit vehicle speed in a vehicle in which the drive force generated by the drive device is controlled at least based on an accelerator opening, wherein the vehicle speed limiting method includes a step of starting vehicle speed limitation by the vehicle speed limiting control when the vehicle speed increases and reaches the limit vehicle speed and a step of allowing the vehicle speed to be equal to or higher than the limit vehicle speed and controlling the drive force generated by the drive device based on the accelerator opening when the accelerator opening becomes a value equal to or larger than an increase reference value larger than a decrease reference value after the accelerator opening has decreased to a value equal to or smaller than the decrease reference value within a predetermined time from a time point when the vehicle speed limitation is released during the vehicle speed limitation being executed by the speed limiting control.

* * * * *